July 3, 1923.
J. W. PRIEST
ANIMAL HOPPLE
Filed Oct. 26, 1921
1,460,919
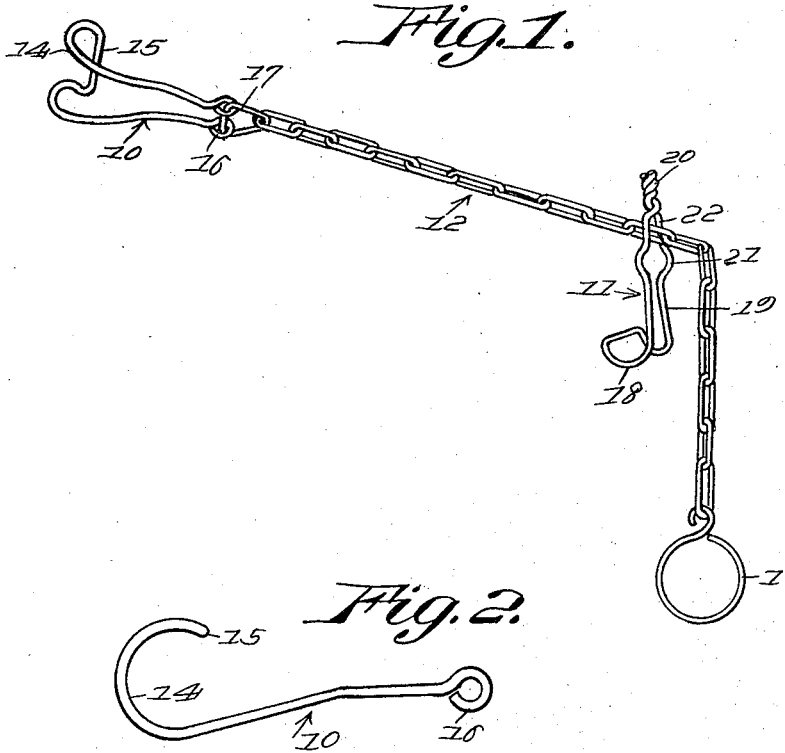
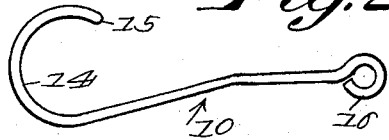
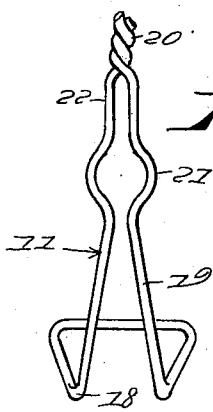
Inventor
J. W. Priest, Patented July 3, 1923.

1,460,919

UNITED STATES PATENT OFFICE.

JOHN W. PRIEST, OF BOISE, IDAHO.

ANIMAL HOPPLE.

Application filed October 26, 1921. Serial No. 510,510.

*To all whom it may concern:*

Be it known that JOHN W. PRIEST, a citizen of the United States of America, residing at Boise, in the county of Ada and State of Idaho, has invented new and useful Improvements in Animal Hopples, of which the following is a specification.

The object of the invention is to provide a simple hopple for use in connection with cattle or stock and more particularly cows during the milking operation to prevent a fractious cow from kicking and either injuring the operator or overturning the bucket, and more particularly to provide a device for this purpose which can be applied with facility and which will not serve to irritate or injure the animal or render the same restive, and which can be repeatedly used without chafing or causing sores; and with these objects in view the invention consists in a construction and combination of parts of which a preferred embodiment is shown in the accompanying drawings, wherein:—

Figure 1 is a view in perspective of a hopple embodying the invention.

Figures 2 and 3 are detail views respectively in side and front elevation of the leg engaging hooks.

The device consists essentially of leg engaging hooks 10 and 11 connected by a chain 12, the hook 10 being terminally connected with the chain and the hook 11 having a running engagement therewith and therefore being adapted for adjustment relative to the length of the chain to suit the position of the animal or the distance between the hind legs as the animal stands in position for milking.

The hooks are designed for engagement with the tendons or leaders of the hind legs of the animal just above the hock joint, and when so engaged with the intervening or connecting portion of the chain drawn relatively taut, any effort of the animal to raise the right hind leg and kick forward therewith will be effectively resisted. The end of the chain opposite to the terminally attached hook 10 is preferably provided with a ring 13 merely as a convenient means of handling the same and preventing the detachment of the hook 11.

Both of the hooks are of looped form and are preferably constructed of wire or rod, so that the intermediate or jaw portion of each hook which engages the leg of the animal is smooth and unbroken with no tendency to chafe or cause injury to the hide. The terminal hook 10 is provided with a curved jaw 14 of which the side members are spaced apart and are connected by a substantially straight transverse member 15 adapted to lie in the crease or angle between the tendon and the fleshy part of the leg of the animal, and the side arms of the hook converge toward their free ends which are coiled to provide eyes 16 to engage the ring 17 by which they are connected with the end of the chain.

The hook 11 has a jaw 18 corresponding in shape with that described as hook 10, but the arms 19 thereof while arranged in a rearwardly convergent relation are connected at their extremities by being intertwisted as shown at 20 to form a grip or handle to be grasped by the operator in positioning the jaw on the leg of the animal. The advantage of this construction of grip is that should the animal kick while the hook is being positioned, and thereby forcibly draw the same out of the hand of the operator, it will not be likely to cause injury to the fingers. The side arms of the hook 11 are drawn together adjacent to the intertwisted or grip portion 20 to receive a link of the chain flatwise so that when the chain is forced up into this portion of the device it will be locked against movement through the hook and the hooks will be maintained at a fixed interval or spacing. At intermediate points, however, the arms of the hook 11 are curved outwardly or bulged as indicated at 21 to form an opening through which the chain will move freely. Therefore in applying the device to the legs of the animal, after positioning the hook 10, the grip portion of the hook 11 may be grasped between the finger and thumb of one hand of the operator while the other hand holds the ring 13, and the hook 11 may then be moved longitudinally of the chain toward the hook 10 and engaged with the other leg of the animal. When such arrangement has been effected a slight lateral movement of the chain to bring a selected link thereof into the seat 22 represented by the portions of the side arms of the hook adjacent to the grip 20 will lock the hook in its adjusted position.

Having described the invention, what is claimed as new and useful is:—

A hopple consisting of a chain having a terminal hook, and a second hook having a running engagement with the chain and adapted to be locked at any desired point throughout the length thereof, the running hook being of looped construction with rearwardly convergent arms bulged outwardly to form an opening through which the links of the chain may pass freely, the arms beyond the bulged portions being arranged in parallelism to provide a seat for selected links and the extremities being intertwisted to form a rigid handle.

In testimony whereof he affixes his signature.

JOHN W. PRIEST.